United States Patent
Pan

(10) Patent No.: US 9,223,713 B2
(45) Date of Patent: Dec. 29, 2015

(54) ALLOCATION OF CACHE TO STORAGE VOLUMES

(71) Applicant: Hewlett-Packard Development Company, L.P., Houston, TX (US)

(72) Inventor: Weimin Pan, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 225 days.

(21) Appl. No.: 13/906,291

(22) Filed: May 30, 2013

(65) Prior Publication Data

US 2014/0359226 A1  Dec. 4, 2014

(51) Int. Cl.
 G06F 12/08 (2006.01)
(52) U.S. Cl.
 CPC .... *G06F 12/0873* (2013.01); *G06F 2212/1024* (2013.01); *G06F 2212/601* (2013.01)
(58) Field of Classification Search
 None
 See application file for complete search history.

(56) References Cited

U.S. PATENT DOCUMENTS

| | | | |
|---|---|---|---|
| 5,895,485 A | 4/1999 | Loechel et al. | |
| 6,957,294 B1 * | 10/2005 | Saunders et al. | 711/4 |
| 8,281,098 B2 | 10/2012 | Eguchi et al. | |
| 2007/0033433 A1 | 2/2007 | Pecone et al. | |
| 2009/0150640 A1 * | 6/2009 | Royer et al. | 711/173 |
| 2009/0210620 A1 | 8/2009 | Jibbe et al. | |
| 2011/0208914 A1 * | 8/2011 | Winokur et al. | 711/119 |
| 2012/0221774 A1 | 8/2012 | Atkisson et al. | |
| 2012/0324171 A1 | 12/2012 | Benhase et al. | |
| 2014/0025890 A1 * | 1/2014 | Bert et al. | 711/118 |

OTHER PUBLICATIONS

Whyte, B., IBM SAN Volume Controller 4.2.1 Cache Partitioning, (Research Paper), Apr. 30, 2008, 12 pps., http://www.redbooks.ibm.com/redpapers/pdfs/redp4426.pdf.

* cited by examiner

*Primary Examiner* — Daniel Tsui
(74) *Attorney, Agent, or Firm* — Hewlett Packard Enterprise Patent Department

(57) ABSTRACT

A technique for allocating a write cache allowed data size of a write cache from a plurality of write caches to each of a plurality of storage volumes, calculating a write cache utilization of the write cache for each of the respective storage volumes, wherein the write cache utilization is based on a write cache dirty data size of the write cache allocated to the respective storage volume divided by the write cache allowed data size of the write cache allocated to the respective storage volume, and adjusting the write cache allowed data size of the write cache allocated to storage volumes based on the write cache utilization of the write cache of the storage volumes.

11 Claims, 7 Drawing Sheets

ALLOCATION OF CACHE TO STORAGE VOLUMES

BACKGROUND

Storage device controllers, such as redundant array of independent disk (RAID) controllers, may be associated with a cache. A host seeking to write data to or read data from a storage device, may access the cache instead of the storage device, in order to reduce latency and increase performance.

DESCRIPTION OF THE DRAWINGS

Examples are described in the following detailed description and an reference to the drawings, in which.

DETAILED DESCRIPTION

Figure 1:
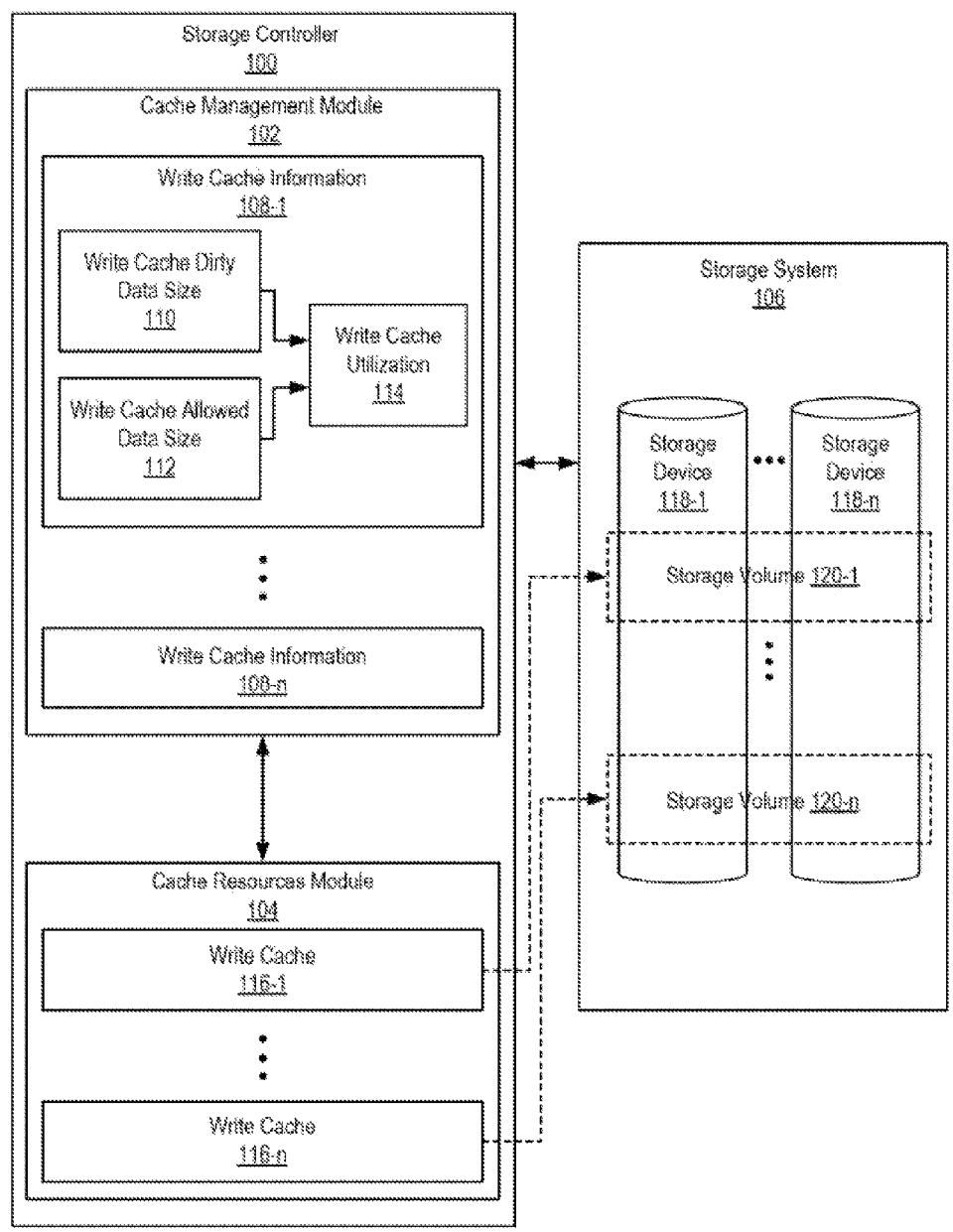
FIG. 1 depicts an example storage controller for allocation of write cache to storage volumes in accordance with an example of the techniques of the present application.

A storage system may include storage device controllers, such as RAID controllers, which may be associated with a cache. A host seeking to write data to or read data from a storage device, may access the cache instead of the storage device, in order to reduce latency and increase performance. Storage devices, such as hard disk drives, may be configured as storage volumes which allow the host to interface with storage using a logical address and without having to have knowledge of the physical layout or structure of the storage devices. The storage controller may include a read cache which may hold data from the storage volume and then allow the controller to return back the data to the host from the cache which may reduce read latency. The storage controller may include a write cache, such as a post write back cache, which may be configured to allow the storage controller to write data from the host to the write cache and then return back to the host without having to wait for the data to be written to the storage volume which may reduce latency and improve write performance. The system may allocate cache resources, such as write cache, to the storage volumes associated with the storage devices. However, the storage controller may not take into consideration the workload from write requests directed to the storage volumes which may result in some write caches that may overutilized and other write caches that may be underutilized.

It may be difficult for the storage controller to fairly distribute write cache resources to all busy storage volumes with large workloads. For example, the storage controller may allocate write cache resources to storage volumes until there are no longer write cache resources available for allocation. If the system experiences abnormal storage device activity of a storage volume, such as very slow disk drive response due to large amounts of media errors in a volume, then the storage controller may allocate write cache resources to the storage volume which may result in the storage volume consuming all write cache resources since flushing dirty data from the write cache to that volume may be much slower than other volumes. The term dirty data refers to the data that was written to the write cache by the storage controller but not yet written from the write cache to the appropriate storage volume.

In one example of the present application, disclosed are techniques that may measure or calculate the write cache utilization of the write cache of each of the storage volumes and dynamically distribute cache resources such as write cache to each of the storage volumes based on the needs or requirements of the storage volumes represented by the write cache utilization. In one example, the write cache utilization may comprise the write cache dirty data size of the write cache of the storage volume divided by the total write cache allowed data size of the write cache for that storage volume. The total allowed write cache for each of the storage volumes may include a maximum write cache size of the write cache that each storage volume is allocated or allowed to use. The higher the write cache utilization, the more write cache that may be required or allocated for that storage volume. These techniques may allocate to higher write cache utilization storage volumes with more write cache resources than lower write cache utilization storage volumes. In one example, if there are multiple storage volumes that are overutilized e.g., 100% write cache utilization, the storage controller may evenly distribute the write cache resources to all the overutilized storage volumes.

Some examples of the present application may help improve the performance of storage systems with techniques to adjust the allocation of cache resources, such as write cache, to storage volumes based on write cache utilization. In one example, disclosed is a storage controller that includes a cache resources module that includes a plurality of write caches for allocation to a plurality of storage volumes. The storage controller includes a cache management module to allocate write cache allowed data size of a write cache from the plurality of write caches to each of the storage volumes. The storage controller may calculate write cache utilization of the write cache for each of the respective storage volumes. In one example, the write cache utilization of the write cache is based on write cache dirty data size of the write cache allocated to the respective storage volume divided by the write cache allowed data size of the write cache allocated to the respective storage volume. The storage controller may then adjust the write cache allowed data size of the write cache allocated to storage volumes based on the write cache utilization of the write cache of the storage volumes.

In this manner, the techniques of the present application may be able to fairly distribute write cache resources among all the storage volumes such that higher utilization storage volumes may be allocated more write cache resources than lower utilization storage volumes. In another example, when multiple storage volumes require additional write cache resources (e.g., allocated write cache allowed data size has been 100% used), the techniques may evenly distribute the write cache resources among these storage volumes to help avoid one storage volume from consuming or being allocated all the write cache resources. Furthermore, the techniques may consume relatively little storage controller processor cycles which may not have a significant impact on other workload performance that is storage controller processor bottlenecked.

FIG. 1 depicts an example storage controller 100 for allocation of write cache to storage volumes in accordance with an example of the techniques of the present application. The storage controller 100 may couple to or be included in any type of computing device that interfaces with a memory, such as a secure microprocessor, a notebook computer, a desktop computer, an all-in-one system, a server, a network device, a wireless device and the like. In the embodiment of FIG. 1, storage controller 100 connects to a storage system 106.

The storage controller 100 may include, for example, a hardware device including electronic circuitry for implementing the functionality described below, such as control logic and/or memory. In addition or as an alternative, the storage controller 100 may be implemented as a series of instructions encoded on a machine-readable storage medium and executable by a processor. For example, storage controller 100 may independently run an application and/or operating system (OS) for interfacing to storage system 106. The storage controller 100 may connect to a host (not shown) to receive requests for access to storage system 106. The requests may include requests to write data to storage system 106 and requests to read data from the storage system. The host may refer to any type of device that seeks to access the storage system 106, such as a main processor of a computer or a computer connected to a computer network.

The storage system 106 may include a plurality of storage devices 118 (118-1 through 118-n, where n is a natural number) which may be any electronic, magnetic, optical, or other physical storage device that contains or stores data and/or executable instructions, such as a hard disk drive (HDD), solid-state drive (SSD) and the like. The storage controller 100 may configure storage devices 118 through a virtualization process to virtualize the storage devices 118 into storage volumes 120 (120-1 through 120-n, where n is a natural number). In this manner, a host may access data on storage system 106 through storage volumes 120 that span multiple storage devices 118 without having to have knowledge of the physical structure of the storage devices. In one example, storage controller 100 may communicate with storage system 106 via a Serial Attached SCSI (SAS) connection and may communicate with host via a Peripheral Component Interconnect (PCI) connection.

The storage controller 100 may receive a plurality of requests. The plurality of requests may include read and/or write accesses to sequential and/or random addresses of storage devices 118. The storage devices 118 may include a plurality of storage drives which may refer to storage mechanisms with fixed or removable media, such as separate HDDs and the like. The storage devices 118 may further be based on a number of drives of the storage devices storage controller 100 is to access per request. For example, the plurality of storage drives of the storage devices 118 may define a structure referred to as a redundant array of independent disks (RAID). In this case, the storage device type may identify a level of a RAID volume. In one example, the term volume may refer to a single accessible storage area with a single file system. While a volume may occupy an area different from a physical disk drive, it may be still accessed with an operating system's logical interface. For example, a RAID 0 volume includes block-level striping without parity or mirroring and no redundancy. A RAID 1 volume includes mirroring without parity or striping. In this case, data is written identically to two storage drives thereby producing a mirrored set of data. A request from a host related to read access may be serviced by either of the two storage drives containing the requested data. Further, a request from the host related to write access updates the strips of both drives. In another example, a RAID 10 volume includes mirroring and striping, where data is written in stripes across the primary drives and then mirrored to the secondary drives. For example, a typical RAID 10 configuration may consist of two primary drives and two secondary drives.

The storage controller 100 is configured to manage the operation of storage system 106 through the use of a cache management module 102 and cache resources module 104. The cache resources module 104 includes a plurality of cache resources such as write cache 116 (116-1 through 116-n, where n is a natural number). The cache management module 102 may interact with cache resources module 104 to allocate cache resources such as write cache 116 to respective storage volumes 120 based on the requirements of the storage volumes such as respective write cache information 108 (108-1 through 108-n, where n is a natural number). The cache management module 102 may assign to respective storage volumes 120 write cache information 108 that includes respective write cache dirty data size 110 to keep track of the size of the write cache dirty data associated with the write cache allocated to the storage volume, write cache allowed data size 112 to keep track of the allowed size of the write cache allocated to the storage volume, and write cache utilization 114 to keep track of the write cache utilization of the write cache allocated to the storage volume. The storage controller 100 may be configured to adjust cache resources based on workload which may comprise write requests and read requests directed to storage volumes.

The cache management module 102 is configured to allocate a write cache allowed data size 112 of a write cache from the plurality of write cache 116 to each of the storage volumes 120 represented by dashed lines with arrows extending from the write cache to storage volumes. In one example, the write cache allowed data size 112 of the write cache allocated to each of the storage volumes may comprise an upper limit defined by a maximum write cache size to be used by the storage volumes. In another example, the write cache allowed data size 112 of the write cache allocated to each of the storage volumes may be configured to not exceed an upper limit defined by a maximum write cache to be used by the storage volumes, and not to exceed a lower limit defined by a minimum cache write comprising a maximum stripe size. The storage system 106 includes storage devices 118 that may be configured as storage volumes 120. The storage volumes 120 may be formed based on a virtualization process that includes mapping logical block address (LBA) to physical address of physical storage devices such as hard disk drives. The host may access the storage system 106 using logical address without having to need to know the physical address of the storage devices 118. This mapping may depend on the RAID level implemented in storage system 106. A stripe represents a number of blocks in storage volume that is distributed across storage devices 118. For example, the system may configure storage system 106 to process data in 512 block portions which may be stripped or distributed across multiple storage devices such as disk drives.

The cache management module 102 may keep track of the write cache dirty data size 110 of the write cache associated with respective storage volumes 120. In one example, the write cache dirty data size 110 of the write cache may comprise an amount of data written to the write cache that has not been written to the storage volumes. The cache management module 102 may calculate write cache utilization 114 of the write cache allocated to each of the respective storage volumes 120. The cache management module 102 may calculate write cache utilization 114 of the write cache as a background task and in a periodic manner, for example. In one example, write cache utilization 114 may be based on write cache dirty data size 110 of the write cache associated with the respective storage volume divided by write cache allowed data size 112 of the write cache allocated to the respective storage volumes. The cache management module 102 may be configured to then adjust the write cache allowed size 112 of the write cache allocated to storage volumes based on the write cache utilization 114 of the write cache of the storage volumes. In this manner, as explained below in further detail, write cache resources may be dynamically adjusted such that write cache from storage volumes with low utilization or workload associated with write requests may be reallocated to storage volumes with high utilization or workload.

The write cache resources module 104 may comprise write cache 116 that may be any type of electronic memory device to store data to be written to storage device 118. In one example, write cache 116 may be a post write back cache which is configured to allow cache management module 102 to write data to the cache and not have the cache management module wait for the data from the cache to be written to the storage devices. That is, a host may send a request to storage controller 100 to write data to storage devices 118. In response, cache management module 102 may write the data to the write cache and then respond with a successful acknowledgement to the host once the cache management module writes the data to the write cache. The cache management module 102 may use write cache dirty data size 110 of a write cache to keep track of the amount of "dirty data" in the write cache which is data that has been written to the write cache but not written to storage devices 118. The storage controller 100 may include a background task which may be configured to periodically execute to flush or write the dirty data from the write cache to the appropriate storage devices or storage volumes. However, in one example, the background task may be able to flush some but not all of the data from the write cache to the storage volumes, therefore there still may be data in the write cache that may take some time or several cycles to be written to storage volumes. The amount of data that remains in the write cache as dirty data depends on the input rate at which data is written to the write cache and the output rate at which data is written from the write cache to the storage volume. For example, if the input rate is higher than the output rate, then there will be larger amount of data on the write cache. On the other hand, if the input rate is lower than the output rate, then there will be a lower or smaller amount of data on the write cache.

In another example, cache resource modules 104 may include cache resources such as write cache that may be configured as a write through cache in which data is written to the cache but the storage controller needs to wait for the data to be written from the cache to the storage device before it may respond to the host that the data has been written to the storage device. In another example, cache resource modules 104 may include a plurality of read cache which may be used by storage controller 100 to read data from the read cache and return to the data to a host. In general, write cache 116 may allow storage controller 100 to lower the write latency and improve write performance. For example, data writes to the write cache 116 may have a lower latency than that of the storage device 118. For instance, the write cache 116 may include double data rate (DDR) RAM while the storage device 118 may include a HDD.

It should be understood that the above example configuration is for illustrative purposes and that other examples and configurations are possible to practice the techniques of the present application. For example, the functionality of cache management module 102 and cache resources module 104 may be combined into a single module or distributed among different separate functional modules, the functionality of storage controller 100 may be distributed across remote locations or integrated in one device, and the like.

Figure 2:
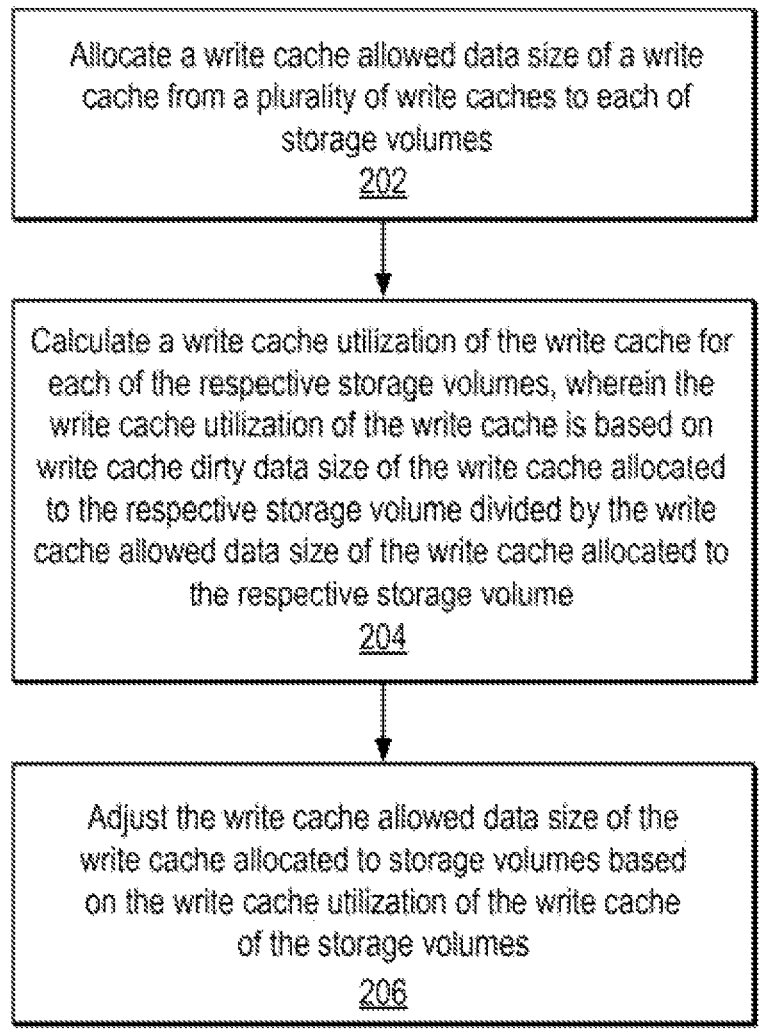
FIG. 2 depicts an example flow chart of a process of allocation of write cache to storage volumes in accordance with an example of the techniques of the present application.

FIG. 2 depicts an example flow chart 200 of a process for allocation of write cache to storage volumes in accordance with an example of the techniques of the present application. In some implementations, such process 200 is conducted by the previously-mentioned storage controller 100. It should be readily apparent that the process depleted in FIG. 2 represent generalized illustrations, and that other processes may be added or existing processes may be removed, modified, or rearranged without departing from the scope and spirit of the present application. In addition, it should be understood that the processes may represent instructions stored on a processor-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with a storage controller. Furthermore, the flow charts are not intended to limit the implementation of the present application, but rather the flow charts illustrate functional information that may be used to design/fabricate circuits, generate software, or may be used as a combination of hardware and software to perform the illustrated processes.

The process 200 may begin at block 202, where cache management module 102 allocates write cache allowed data size a write cache from a plurality of write caches to each of storage volumes. For example, to illustrate, it may be assumed that cache management module 102 configures storage devices 118 to have a first storage volume 120-1 and a second storage volume 120-2 which are distributed or formed across the storage devices. The cache management module 102 interacts with cache resources module 104 to allocate a first write cache 116-1 to first storage volume 120-1 and allocate a second write cache 116-2 to second storage volume 120-2. To illustrate, it may be further assumed that cache management module 102 provides a total write cache size of 2 gigabytes (GB) and from this total the cache management module allocates a first write cache allowed data size 112-1 of 1 GB for first write cache 116-1 and allocates a second write cache allowed size 112-2 of 1 GB for second write cache 116-2. Once cache management module 102 allocates the write cache allowed data size of the write cache to the storage volumes, processing proceeds to block 204.

At block 204, cache management module 102 calculates write cache utilization of the write cache for each of the respective storage volumes. In one example, write cache utilization 114 may be based on write cache dirty data size 110 of the write cache allocated to the respective storage volume divided by write cache allowed data size 112 of the write cache associated with the respective storage volume. In one example, to illustrate operation, a host may begin to send to storage controller 100 write requests to write data to respective first storage volume 120-1 and second storage volume 120-2. It may be assumed that the write requests may represent workloads comprising write requests that are evenly distributed across both storage volumes. For example, first write request 122-1 and second write request 122-2 may contain data directed to respective first storage volume 120-1 and second storage volume 120-2 but are first written to respective first write cache 116-1 and second write cache 116-2. That is, cache management module 102 first writes the data from the host to the first write cache 116-1 and the second write cache 116-2 and then returns a successful response to the host so that the cache management module and host may resume further processing.

The cache management module 102 may be configured to periodically execute a background task that writes or flushes some portion of the data from the first write cache 116-1 and second write cache 116-2 to respective first storage volume 120-1 and second storage volume 120-2. However, in one example, the background task may be able to flush some but not all of the data from the write cache to the storage volumes, therefore there still may be data in the write cache that may take some time to be written to storage volumes. In one example, write cache dirty data size 110 of the write cache for each storage volume may increase from a size of zero megabytes (MB) to a size of 500 MB. The cache management module 102 calculates a write cache utilization 114 of the write cache 50% based on write cache dirty data size 110 (500 MB) of the write cache divided by write cache allowed data size 112 (1 GB) of the write cache for each of first storage volume 120-1 and second storage volume 120-2. Once cache management module 102 calculates write cache utilization 114 of the write cache, processing proceeds to block 206.

At block 206, cache management module 102 adjusts write cache allowed data size of the write cache allocated to storage volumes based on write cache utilization 114 of the write cache of the storage volumes. For example, when a host sends a relatively large workload of write requests to first storage volume 120-1 compared to the workload to second storage volume 120-2, cache management module 102 is configured to rebalance or reallocate write cache resources (write cache 116) by increasing first write cache allowed data size 112-1 of of the write cache of the first storage volume 120-1 to a larger amount compared to that of second storage volume 120-2 until the write cache utilization 114 of the write cache of first storage volume and the second storage volume are substantially equal.

To illustrate, cache management module 102 may generate a larger number of first write requests containing data directed to first storage volume 120-1 compared to the number of second write requests containing data directed to second storage volume 120-2. The cache management module 102 periodically executes a background task that writes or flushes some portion of the data from the first write cache 116-1 and second write cache 116-2 to respective first storage volume 120-1 and second storage volume 120-2. However, in one example, the background task may be able to flush some but not all of the data from the write cache to the storage volumes, therefore there still may be data in the write cache that may take some time to be written to storage volumes. The amount of data that remains in the write cache as dirty data depends on the input rate at which data is written to the write cache and the output rate at which data is written from the write cache to the storage volume. For example, if the input rate is higher than the output rate, then there will be larger amount of data on the write cache. On the other hand, if the input rate is lower than the output rate, then there will be a lower amount of data on the write cache.

As a result of the increase in the amount of write requests directed to first storage volume 120-1 relative to the amount of write requests directed to second storage volume 120-2, cache management module 102 increases first write cache allowed data size 112-1 of first write cache 116-1 from a size of 1 GB to a size of 1.5 GB. In addition, first write cache dirty data size 110-1 of the dirty cache portion 116-1 of the write cache increases from a size of 500 MB to a size of 750 MB. On the other hand, as a result of the increase in the amount of write requests directed to first storage volume 120-1 relative to the amount of write requests directed to second storage volume 120-2, cache management module 102 decreases second write cache allowed data size 112-2 of second write cache 116-2 from a size of 1 GB to a size of 500 MB. In addition, second write cache dirty data size 110-2 of the write cache decreases from a size of 500 MB to a size of 250 MB. The cache management module 102 calculates a first write cache utilization 114-1 of 50% for write cache of the first storage volume 120-1 based on first write cache dirty data size 110-1 (750 MB) of the write cache divided by first write cache allowed data size 112-1 (1.5 GB) of the write cache. In a similar manner, cache management module 102 calculates a second write cache utilization 114-2 of 50% for the write cache of the second storage volume 120-2 based on second write cache dirty data 110-2 (250 MB) of the write cache divided by second write cache allowed data size 112-2 (500 MB) of the write cache.

In this manner, when a host sends a relatively larger workload of write requests to first storage volume 120-1 compared to the workload to second storage volume 120-2, cache management module 102 is configured to rebalance or reallocate write cache resources (write cache 116) by increasing the first write cache allowed data size of the write cache of the first storage volume 120-1 to a larger amount compared to that of second storage volume 120-2 until the write cache utilization of the write cache of the first storage volume and the second storage volume are substantially equal.

It should be understood that the above examples are for illustrative purposes and that other examples and configurations are possible to practice the techniques of the present application. For example, cache management module 102 may configure more than first and second storage volumes and manage different workload configurations.

Figure 3:
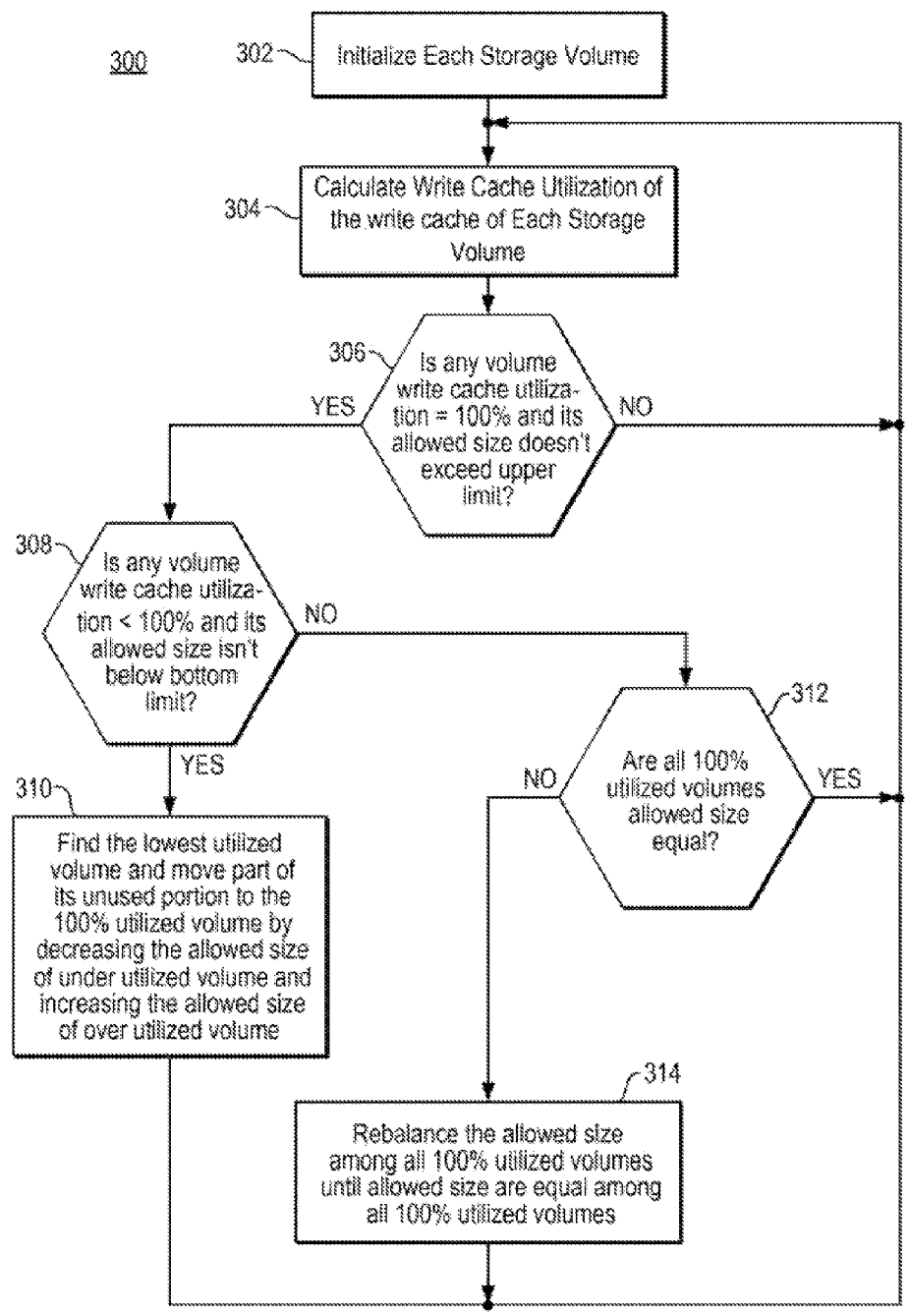
FIG. 3 depicts another example flow chart of a process of allocation of write cache to storage volumes in accordance with an example of the techniques of the present application.

FIG. 3 depicts another example flow chart 300 of a process for allocation of write cache to storage volumes in accordance with an example of the techniques of the present application. In some implementations, such process 300 is conducted by the previously-mentioned storage controller 100. It should be readily apparent that the process depicted in FIG. 3 represent generalized illustrations, and that other processes may be added or existing processes may be removed, modified, or rearranged without departing from the scope and spirit of the present application. In addition, it should be understood that the processes may represent instructions stored on a processor-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with a storage controller. Furthermore, the flow charts are not intended to limit the implementation of the present application, but rather the flow charts illustrate functional information that one skilled in the art could use to design/fabricate circuits, generate software, or use a combination of hardware and software to perform the illustrated processes.

The process 300 may begin at block 302, where cache management module 102 initializes each of storage volumes 120. In one example to illustrate, it may be assumed that cache management module 102 allocates write cache resources to each of storage volumes in a similar manner to the functions performed at block 202 above in connection with FIG. 2 and such description is not repeated here. Once the functions of block 302 are performed, processing proceeds to block 304.

At block 304, cache management module 102 calculates write cache utilization 114 of each of storage volumes 120. In one example to illustrate, it may be assumed that cache management module 102 calculates write cache utilization 114 of each of the storage volumes 120 in a similar manner to the functions performed at block 204 above in connection with FIG. 2 and such description is not repeated here. Once the functions of block 304 are performed, processing proceeds to block 306.

At block 306, cache management module 102 checks whether write cache utilization 114 of a write cache of any storage volume is overutilized and write cache allowed data size 112 of the write cache of the storage volume 120 does not exceed an upper limit.

If cache management module 102 determines that this condition is true, then processing proceeds to block 308. To illustrate, continuing with the above example, cache management module 102 may assign each of first storage volume 120-1 and second storage volume 120-2 an upper limit size of 1 GB. To illustrate, it may be assumed that cache management module 102 calculates first write cache utilization 114-1 of the write cache of the first storage volume 120-1 to be 100% and second write cache utilization 114-2 of the write cache of the second storage volume 120-2 to be 100%. The condition of overutilized may be defined as when the write cache utilization 114 of a write cache of the storage volume 120 is about 100%. The condition of underutilized may be defined as when the write cache utilization 114 of a write cache of the storage volume 120 is less than 100%. In this case, write cache utilization 114 of a write cache of the storage volume 120 is overutilized and write cache allowed data size 112 of a write cache of the storage volume does exceed an upper limit, therefore processing proceeds to block 308. In other words, the write cache of a storage volume has reached it maximum capacity and therefore processing may proceed to further determine whether conditions exist to reallocate write cache to such a storage volume at block 308.

On the other hand, if cache management module 102 determines that this condition is not true, then processing proceeds to block 304. To illustrate, continuing with the above example, cache management module 102 may assign each of first storage volume 120-1 and second storage volume 120-2 an upper limit of write cache size of 1 GB. To illustrate, it may be assumed that cache management module 102 calculates first write cache utilization 114-1 of the write cache of the first storage volume 120-1 to be 50% and second write cache utilization 114-2 of the write cache of the second storage volume 120-2 to be 50%. In this case, write cache utilization 114 of the write cache of any storage volume 120 is not overutilized and write cache allowed data size 112 of the write cache of the storage volume does not exceed an upper limit, therefore processing proceeds to block 304. In other words, the write cache of a storage volume has not reached it maximum capacity and it is not necessary to reallocate write cache to storage volumes.

At block 308, cache management module 102 checks whether write cache utilization 114 of a write cache of the storage volume 120 is underutilized and write cache allowed size 112 of a write cache of the storage volume does not exceed a lower limit.

If cache management module 102 determines that this condition is true, then processing proceeds to block 310. To illustrate, it may be assumed that cache management module 102 calculates first write cache utilization 114-1 of the write cache of the first storage volume 120-1 to be 100% and second write cache utilization 114-2 of the write cache of the second storage volume 120-2 to be 50%. In this case the first write cache utilization 114-1 of the write cache of the first storage volume is overutilized (100% utilization) and second write cache utilization 114-2 of the write cache of the second storage volume is underutilized (50% utilization), therefore processing proceeds to block 310. In other words, the write cache of a storage volume has reached its maximum capacity while the write cache of another storage volume has not reached its maximum capacity and therefore some write cache resources may be reallocated from the underutilized second storage volume to the overutilized first storage volume as described at block 310.

On the other hand, if cache management module 102 determines that this condition is not true, then processing proceeds to block 312. To illustrate, it may be assumed that cache management module 102 calculates first write cache utilization 114-1 of the write cache of the first storage volume 120-1 to be 100% and second write cache utilization 114-2 of the write cache of the second storage volume 120-2 to be 100%. In addition, it may be further assumed that first write cache allowed data size 112-1 of the write cache of the first storage volume 120-1 is 1 GB and that second write cache allowed data size 112-2 of the write cache of the second storage volume 120-2 is 1 GB. In this case, processing proceeds to block 312.

At block 310, cache management module 102 identifies a storage volume 120 with a write cache 116 that is most underutilized and moves part of the unused portion of the write cache 116 of the identified storage volume to the overutilized storage volume. Continuing with the above example, to illustrate, it may be assumed that first write cache utilization 114-1 of the write cache of the first storage volume 120-1 is 100% and second write cache utilization 114-2 of the write cache of the second storage volume 120-2 is 50%. In other words, first write cache utilization 114-1 of the write cache of the first storage volume is overutilized (100% utilization) and second write cache utilization 114-2 of the write cache of the second storage volume is underutilized (50% utilization). In this case, cache management module 102 may reallocate some write cache resources from the underutilized second storage volume to the first overutilized storage volume. For example, cache management module 102 may increase first write cache allowed data size 112-1 of first write cache 116-1 from a size of 1 GB to a size of 1.5 GB. On the other hand, cache management module 102 may decrease the size of second write cache allowed data size 112-2 of second write cache 116-2 from a size of 1 GB to a size of 500 MB. Once the functions of block 310 are performed, processing proceeds back to block 304 to calculate write cache utilization.

At block 312, cache management module 102 checks whether write cache allowed data size 112 of all overutilized storage volumes 120 are equal.

If cache management module 102 determines that this condition is true, then processing proceeds to block 304. For example, to illustrate, it may be assumed that first write cache utilization 114 of the write cache of the first and second storage volumes are each 100% and that write cache allowed data size 112 of the write cache of the first and second storage volumes 120 are equal. In this case, cache management module 102 may not be able to reallocate write cache resources therefore processing proceeds back to block 304.

On the other hand, if cache management module 102 determines that this condition is not true, then processing proceeds to block 314. For example, to illustrate, it may be assumed that cache first write cache utilization 114 of the write cache of the first and second storage volumes 120 are each 100%. However, it may be assumed to illustrate that first write cache allowed data size 112-1 of the write cache of the first storage volume 120-1 is 500 MB and second write cache allowed data size 112-2 of the write cache of the second storage volume 120-2 is 1 GB. In this case, cache management module 102 may be able to reallocate write cache resources therefore processing proceeds to block 314.

At block 314, cache management module 102 rebalances write cache allowed data size 112 of all of the overutilized storage volumes 120 until the allowed size among all of the overutilized storage volumes are equal. For example, to illustrate, it may be assumed that cache first write cache utilization 114 of the write cache of the first and second storage volumes are each 100%. However, it may be assumed to illustrate that first write cache allowed data size 112-1 of the write cache of the first storage volume 120-1 is 500 MB and second write cache allowed data size 112-2 of the write cache of the second storage volume 120-2 is 1 GB. In this case, cache management module 102 may reallocate write cache resources from second storage volume 120-2 to first storage volume 120-1. For example, cache management module may reallocate write cache resources such as to increase first write cache allowed data size 112-1 of the write cache of the first storage volume 120-1 from 500 MB to 750 MB and decrease second write cache allowed data size 112-2 of the write cache of the second storage volume 120-2 from 1 GB to 750 MB. In this manner, cache management module 102 reallocates write cache resources from second storage volume 120-2 to first storage volume 120-1. The process to rebalance and reallocate write cache resources may be performed in an incremental manner and may require several iterations for proper adjustment. Once the functions of block 314 are performed, processing proceeds to block 304.

In one example, when cache management module 102 determines that a storage volume needs or requires some additional write cache resources, it may first check to determine whether the storage volume has reached its limit by comparing its used write cache size to its allowed write cache size. If cache management module 102 determines that the write cache of the storage volume has not reached its limit, then the cache management module may reallocate write cache resources and assign it to that storage volume. On the other hand, if cache management module 102 determines that the write cache of the storage volume has reached the limit, then the cache management module may have the storage volume either wait for its used write cache to be flushed to storage devices or have it bypass its write cache and directly write the data to the storage devices.

It should be understood that the above examples are for illustrative purposes and that other examples and configurations are possible to practice the techniques of the present application. For example, cache management module 102 may configure more than first and second storage volumes and manage different workload configurations.

Figure 4A:
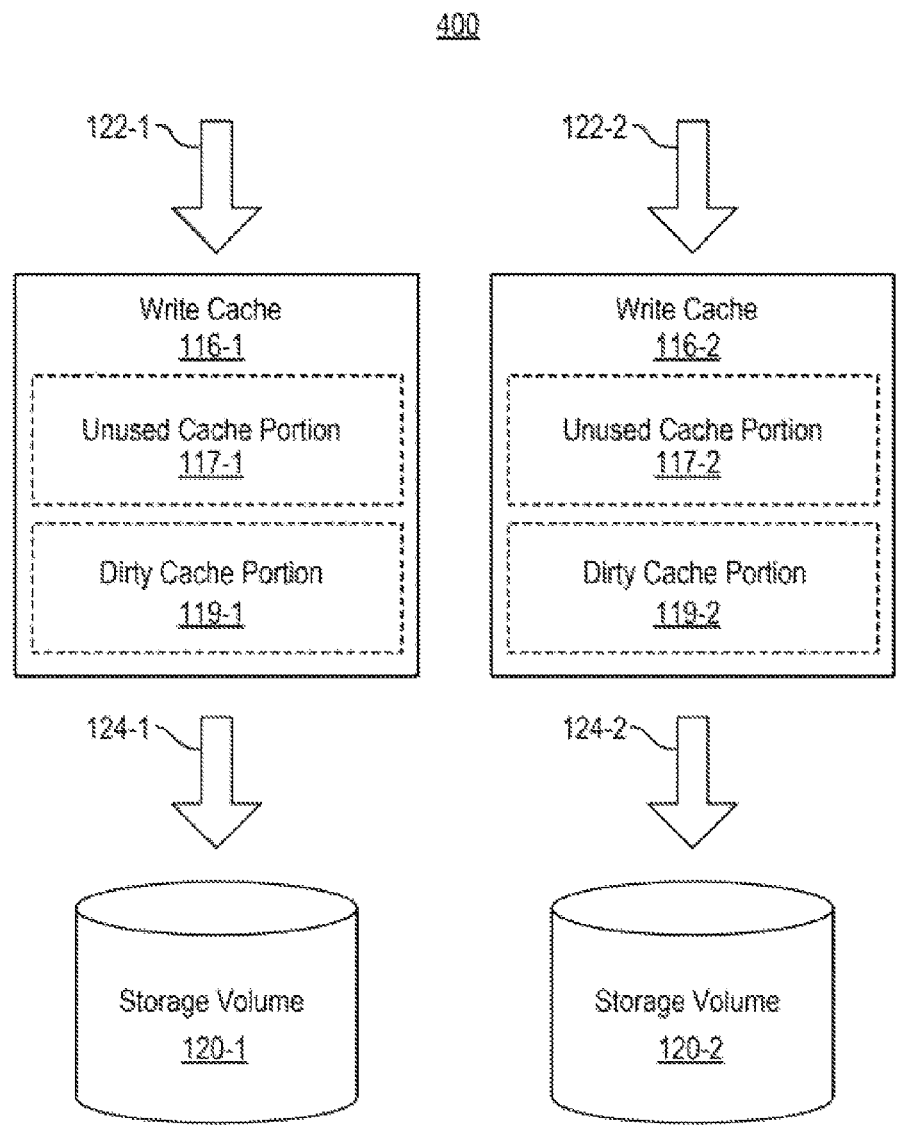
FIGS. 4A though 4C depict example process diagrams of allocation of write cache to storage volumes in accordance with an example of the techniques of present the application.
Figure 4B:
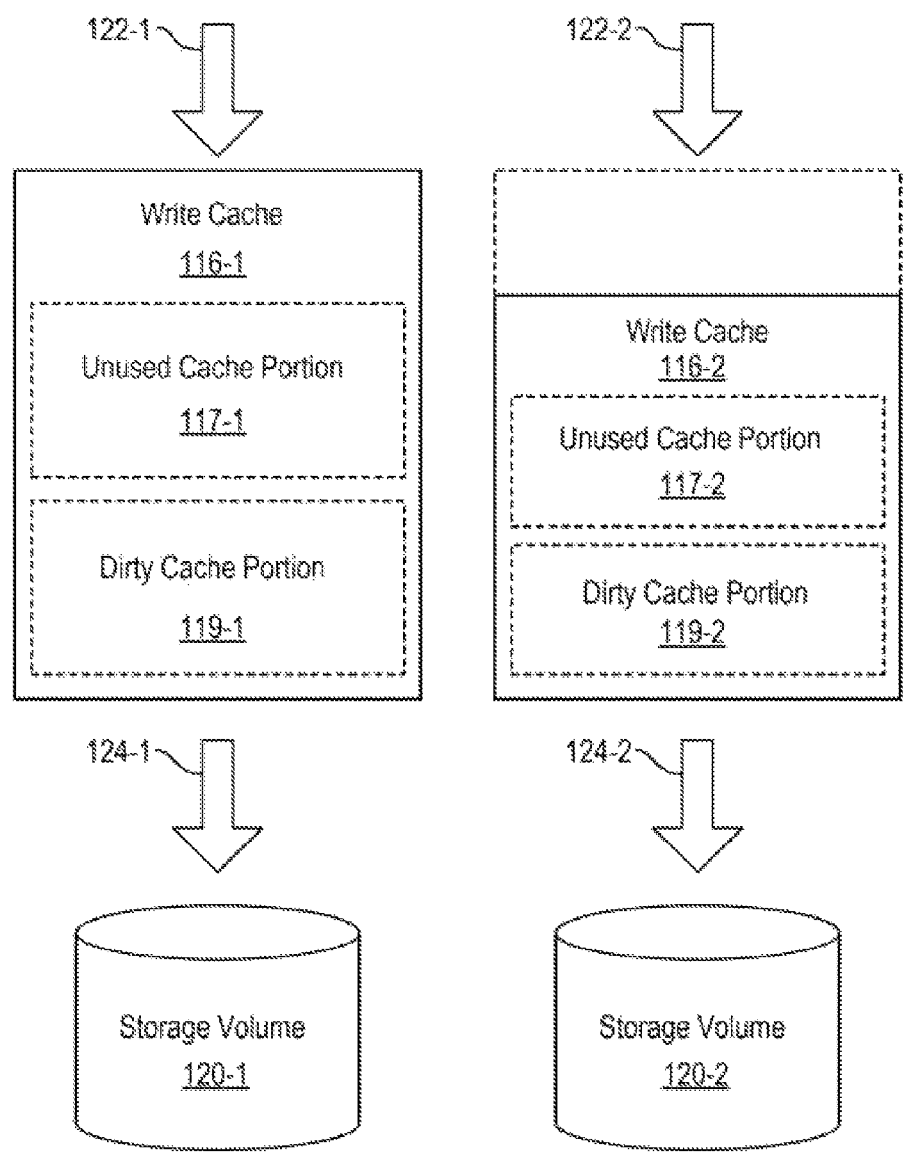
Figure 4C:
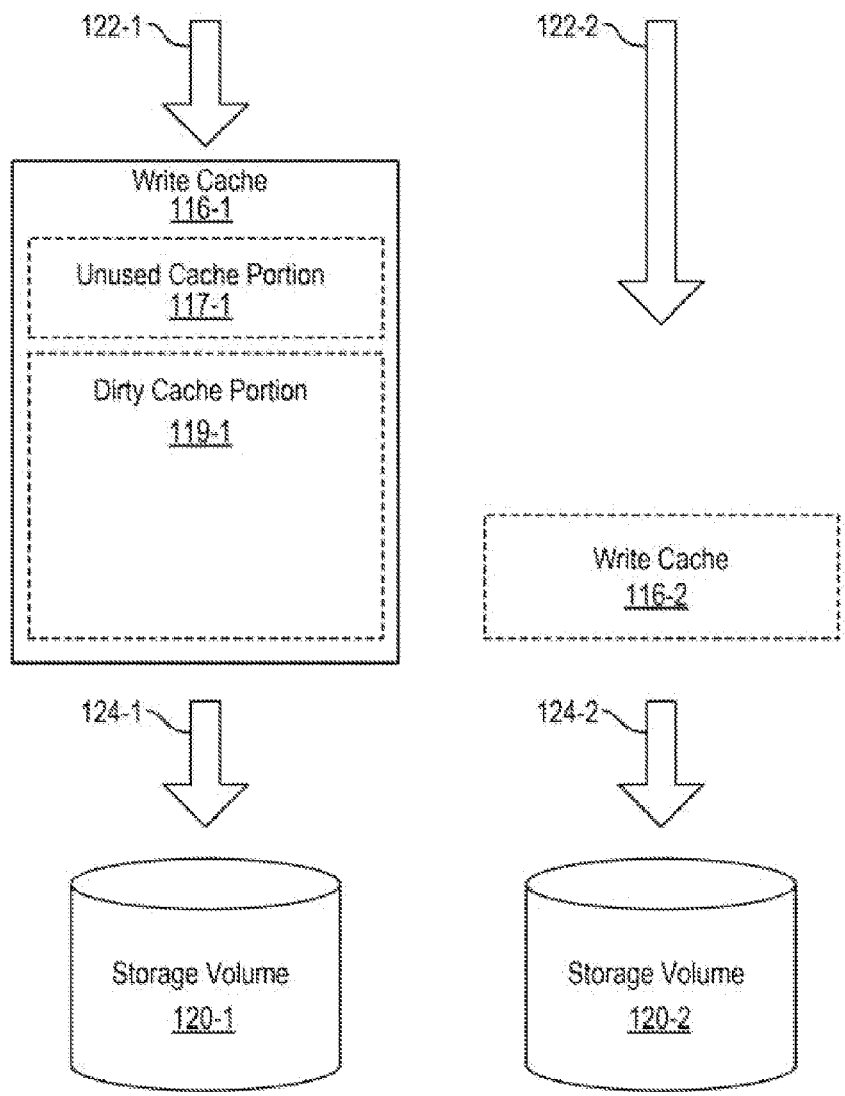

FIGS. 4A through 4C depict example process diagrams of allocation of write cache to storage volumes in accordance with an example of the techniques of the present application.

FIG. 4A shows an example diagram 400 of a storage system with an even workload comprising write requests distributed evenly across storage volumes. For example, to illustrate, it may be assumed that cache management module 102 configures storage devices 118 to have a first storage volume 120-1 and a second storage volume 120-2 which are formed across the storage devices. The cache management module 102 interacts with cache resources module 104 to allocate a first write cache 116-1 to first storage volume 120-1 and allocate a second write cache 116-2 to second storage volume 120-2. To illustrate, it may be further assumed that cache management module 102 provides a total cache write size of 2 GB and from this total the cache management module allocates a first write cache allowed data size 112-1 of 1 GB for first write cache 116-1 and allocates a second write cache allowed size 112-2 of 1 GB for second write cache 116-2.

During an initialization process, for example, cache management module 102 may not have received requests from host to write data to first write cache 116-1 and second write cache 116-2 and therefore the cache may not have any data or content. Accordingly, write cache dirty data size 110-1, 110-2 of respective dirty cache portions 119-1, 119-2 have both a size of zero because they do not hold any data or content at this point in the process. On the other hand, first unused cache portion 117-1 and second unused cache portion 117-2 do not hold data or content which means that their size is each 1 GB and are available for use to hold data. In one example, to illustrate operation, a host may begin to send to storage controller 100 write requests to write data, represented by arrows 122-1 and 122-2, to respective first storage volume 120-1 and second storage volume 120-2. It may be assumed that the write requests may represent workloads comprising write requests that are evenly distributed across both storage volumes. For example, first write request 122-1 and second write request 122-2 may contain data directed to respective first storage volume 120-1 and second storage volume 120-2 but are first written to respective first write cache 116-1 and second write cache 116-2. That is, cache management module 102 first writes the data from the host to the first write cache 116-1 and the second write cache 116-2 and then returns a successful response to the host so that the cache management module and host may resume further processing. The first write cache 116-1 and second write cache 116-2 hold the data in respective first dirty cache portion 119-1 and second dirty cache portion 119-2.

The cache management module 102 may be configured to periodically execute a background task that writes or flushes, represented by arrows 124-1 and 124-2, some portion of the data from the first dirty cache portion 119-1 and second dirty cache portion 119-2 to respective first storage volume 120-1 and second storage volume 120-2. However, in one example, the background task may be able to flush some but not all of the data from the write cache to the storage volumes, therefore there still may be data in the write cache that may take some time or several cycles to be written to storage volumes. In one example, as a result of the background task writing or flushing some portion of data from the dirty portion of the cache to the storage volumes, the size of first dirty cache portion 119-1 and second dirty cache portion 119-2 each increase from a size of zero MB to a size of 500 MB. The cache management module 102 calculates a write cache utilization 114 of 50% based on write cache dirty data size 110 (500 MB) of the write cache divided by write cache allowed data size 112 (1 GB) of the write cache for each of first storage volume 120-1 and second storage volume 120-2. In this case, since the distribution of the workload was evenly distributed, cache management module 102 did not have to reallocate or redistribute write cache resources among the storage volumes.

FIG. 4B shows an example diagram 440 of a storage system with an uneven workload of write requests distributed across storage volumes.

In this example, when a host sends a relatively large workload of write requests to first storage volume 120-1 compared to the workload to second storage volume 120-2, cache management module 102 is configured to rebalance or reallocate write cache resources (write cache 116) by increasing first write cache allowed data size 112-1 of the write cache of the first storage volume 120-1 to a larger amount compared to that of second storage volume 120-2 until the write cache utilization 114 of the write cache of the first storage volume and the second storage volume are substantially equal.

Further to the example shown in FIG. 4A, to illustrate, it may be assumed that the host sends to storage controller 100 write requests to write data, represented by arrows 122-1 and 122-2, directed to respective first storage volume 120-1 and second storage volume 120-2. It may be further assumed that the write requests may represent workloads that are not evenly distributed across both storage volumes. For example, cache management module 102 may generate a larger number of first write requests 122-1 containing data directed to first storage volume 120-1 compared to the number of second write requests 122-2 containing data directed to second storage volume 120-2. As explained above, cache management module 102 first writes the data to respective first write cache 116-1 and second write cache 116-2 and then returns a successful response to the host so that the host and cache management module may resume further processing. The first write cache 116-1 and second write cache 116-2 hold the data in respective first dirty cache portion 119-1 and second dirty cache portion 119-2.

As explained above, cache management module 102 may be configured to periodically execute a background task that writes or flushes some portion of the data from the first dirty cache portion 119-1 and second dirty cache portion 119-2 to respective first storage volume 120-1 and second storage volume 120-2. However, in one example, the background task may be able to flush some but not all of the data from the write cache to the storage volumes, therefore there still may be data in the write cache that may take some time or several cycles to be written to storage volumes.

As a result of the increase in the amount of write requests directed to first storage volume 120-1 relative to the amount of write requests directed to second storage volume 120-2, cache management module 102 increases first write cache allowed data size 112-1 of first write cache 116-1 from a size of 1 GB to a size of 1.5 GB. In addition, first write cache dirty data size 110-1 of the dirty cache portion 116-1 increases from a size of 500 MB to a size of 750 MB. On the other hand, as a result of the increase in the amount of write requests directed to first storage volume 120-1 relative to the amount of write requests directed to second storage volume 120-2, cache management module 102 decreases the size of second write cache allowed data size 112-2 of second write cache 116-2 from a size of 1 GB to a size of 500 MB. In addition, second write cache dirty data size 110-2 of the second dirty cache portion 116-2 decreases from a size of 500 MB to a size of 250 MB. The cache management module 102 calculates a first write cache utilization 114-1 of 50% of the write cache for first storage volume 120-1 based on first write cache dirty data size 110-1 (750 MB) of the write cache divided by first write cache allowed data size 112-1 (1.5 GB) of the write cache. In a similar manner, cache management module 102 calculates a second write cache utilization 114-2 of 50% of the write cache for second storage volume 120-2 based on second write cache dirty data 110-2 (250 MB) of the write cache divided by second write cache allowed data size 112-2 (500 MB) of the write cache.

In this manner, when a host sends a relatively larger workload of write requests to first storage volume 120-1 compared to the workload to second storage volume 120-2, cache management module 102 is configured to rebalance or reallocate write cache resources (write cache 116) by increasing the first write cache allowed data size of write cache of the first storage volume 120-1 to a larger amount compared to that of second storage volume 120-2 until the write cache utilization of the write cache of the first storage volume and the second storage volume are substantially equal.

FIG. 4C shows an example diagram 460 of a storage system with an uneven workload distributed across storage volumes.

In this example, when a host sends all of the workload of write requests to first storage volume 120-1 and stops sending a workload of write requests to second storage volume 120-2, cache management module 102 may be configured to again rebalance or reallocate write cache resources, such as write cache 116, to storage volumes. In this case, eventually cache management module 102 reallocates most of the write cache resources, such as write cache 116, to first storage volume 120-1 while only allocating a minimum write cache resource (for a full stripe write needed) to second storage volume 120-2.

Further to the example shown in FIG. 4B, to illustrate, it may be further assumed that the host sends to cache management module 102 write requests to write data, represented by arrows 122-1 and 122-2, directed to respective first storage volume 120-1 and second storage volume 120-2. It may be assumed that the write requests may represent workloads that are not evenly distributed across both storage volumes. For example, cache management module 102 may generate a larger number of first write requests 122-1 containing data directed to first storage volume 120-1 compared to the number of second write requests 122-2 containing data directed to second storage volume 120-2. As explained above, cache management module 102 first writes the data to respective first write 116-1 and second write cache 116-2 and then returns a successful response to the host so that the host or cache management module may resume further processing. The first write cache 116-1 and second write cache 116-2 hold the data in respective first dirty cache portion 119-1 and second dirty cache portion 119-2. The cache management module 102 may be configured to periodically execute a background task that writes or flushes some portion of the data from the first dirty cache portion 119-1 and second dirty cache portion 119-2 to respective first storage volume 120-1 and second storage volume 120-2. However, in one example, the background task may be able to flush some but not all of the data from the write cache to the storage volumes, therefore there still may be data in the write cache that may take some time or several cycles to be written to storage volumes.

As a result of the increase in the amount of write requests directed to first storage volume 120-1 relative to the amount of write requests directed to second storage volume 120-2, cache management module 102 may increase first write cache allowed size 112-1 of first write cache 116-1 from a size of 1.5 GB to a size of 1.9 GB. In addition, first write cache dirty data size 110-1 of the dirty cache portion 116-1 increases from a size of 750 MB to a size of 1.9 GB. On the other hand, as a result of the increase in the amount of write requests directed to first storage volume 120-1 relative to the amount of write requests directed to second storage volume 120-2, cache management module 102 may decrease second write cache allowed size 112-2 of second write cache 116-2 from a size of 500 MB to a size of 10 MB. In addition, second write cache dirty data size 110-2 of the second dirty cache portion 116-2 decreases from a size of 250 MB to a size of zero MB. The cache management module 102 proceeds to calculate first write cache utilization 114-1 of 100% of the write cache for first storage volume 120-1 based on first write cache dirty data size 110-1 (1.9 GB) of the write cache divided by first cache allowed data size 112-1 (1.9 GB). In a similar manner, cache management module 102 calculates a second write cache utilization 114-2 of about 0% of the write cache for second storage volume 120-2 based on second write cache dirty data size 110-2 (zero MB) of the write cache divided by second write cache allowed data size 112-2 (10 MB) of the write cache.

In this manner, when a host sends all of the workload of write requests to first storage volume 120-1 and stops sending a workload of write requests to second storage volume 120-2, cache management module 102 may be configured to again rebalance or reallocate write cache resources, such as write cache 116, to storage volumes. In this case, eventually cache management module 102 reallocates most of the write cache resources, such as write cache 116, to first storage volume 120-1 while only allocating a minimum write cache resource (for a full stripe write needed) to second storage volume 120-2.

It should be understood that the above examples are for illustrative purposes and that other examples and configurations are possible to practice the techniques of the present application. For example, cache management module 102 may configure more than first and second storage volumes and different workload configurations are possible.

Figure 5:
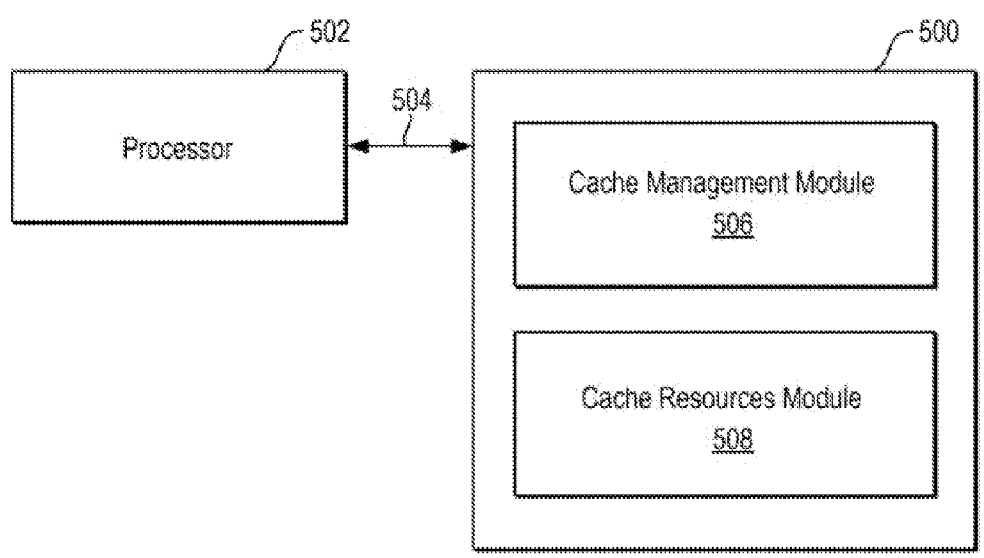
FIG. 5 depicts an example block diagram showing a non-transitory, computer-readable medium that stores instructions for allocation of write cache to storage volumes in accordance with an example of the techniques of the present application.

FIG. 5 is an example block diagram showing a non-transitory, computer-readable medium that stores code for operating a device. The non-transitory, computer-readable medium is generally referred to by the reference number 500 and may be included in storage controller 100 described in relation to FIG. 1. The non-transitory, computer-readable medium 500 may correspond to any typical storage device that stores computer-implemented instructions, such as programming code or the like. For example, the non-transitory, computer-readable medium 500 may include one or more of a non-volatile memory, a volatile memory, and/or one or more storage devices. Examples of non-volatile memory include, but are not limited to, electrically erasable programmable read only memory (EEPROM) and read only memory ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

A processor 502 generally retrieves and executes the instructions stored in the non-transitory, computer-readable medium 500 to operate a storage controller in accordance with an example. In an example, the tangible, machine-readable medium 500 may be accessed by the processor 502 over a bus 504. A first region 506 of the non-transitory, computer-readable medium 500 may include cache management module functionality as described herein. A second region 508 of the non-transitory, computer-readable medium 500 may include cache resources module functionally as described herein.

Although shown as contiguous blocks, the software components may be stored in any order or configuration. For example, if the non-transitory, computer-readable medium 500 is a hard drive, the software components may be stored in non-contiguous, or even overlapping, sectors.

The foregoing may describe a novel and previously unforeseen approach to distribute write cache resources among all the storage volumes such that higher utilization storage volumes may be allocated more write cache resources than lower utilization storage volumes. While the above application has been shown and described with reference to the foregoing examples, it should be understood that other forms, details, and implementations may be made without departing from the spirit and scope of the application that is defined in the following claims.

What is claimed is:

1. A storage controller, comprising:
a cache resources module comprising a plurality of write caches for allocation to a plurality of storage volumes; and
a cache management module to:
allocate a write cache allowed data size of a write cache from the plurality of write caches to the plurality of storage volumes,
calculate a write cache utilization of the write cache for the respective plurality of storage volumes, the write cache utilization is based on a write cache dirty data size of the write cache allocated to the respective storage volume divided by the write cache allowed data size of the write cache allocated to the respective storage volume, the write cache dirty data size of the write cache allocated to the respective storage volume comprises an amount of data written to the write cache allocated to the respective storage volume that has not been written to the respective storage volume, and
adjust the write cache allowed data size of the write cache allocated to the storage volumes based on the respective write cache utilization of the plurality of write caches allocated to the plurality of storage volumes, the write cache allowed data size of the write cache allocated to the plurality of storage volumes not to exceed an upper limit defined by a maximum write cache size for use by the plurality of storage volumes, and not to exceed a lower limit defined by a minimum write cache size comprising a maximum stripe size, a stripe comprises a number of blocks in a storage volume distributed across a plurality of storage devices.

2. The storage controller of claim 1, wherein the cache management module is further to:
when a write cache utilization of a write cache of a first storage volume is overutilized and a write cache allowed data size of the write cache of the first storage volume does not exceed an upper limit, and when a write cache utilization of the write cache of a second storage volume is underutilized and the write cache allowed data size of the write cache of the second storage volume does not exceed a lower limit, then move a part of an unused portion of the write cache of the second storage volume to the write cache of the first storage volume.

3. The storage controller of claim 1, wherein the cache management module is further to:
when write cache utilizations of the write caches of all storage volumes are not overutilized, then decrease an allowed size of a write cache of a most underutilized storage volume and increase an allowed size of a write cache of a most overutilized storage volume.

4. The storage controller of claim 1, wherein the cache management module is further to:
when a first storage volume requires further write cache, check if a limit is reached by comparing a used write cache size of a write cache allocated to the first storage volume to a write cache allowed data size of the write cache allocated to the first storage volume, wherein when the limit is not reached then allocate the further write cache to the first storage volume, wherein when the limit is reached then the first storage volume is to either wait for a used portion of the write cache to be flushed to the first storage volume or to bypass the write cache allocated to the first storage volume and directly write data to the first storage volume.

5. A method, comprising:
allocating, by a processor, a write cache allowed data size of a write cache from a plurality of write caches to a plurality of storage volumes;
calculating, by the processor, a write cache utilization of the write cache for the respective plurality of storage volumes, the write cache utilization is based on a write cache dirty data size of the write cache allocated to the respective storage volume divided by the write cache allowed data size of the write cache allocated to the respective storage volume, the write cache dirty data size of the write cache allocated to the respective storage volume comprises an amount of data written to the write cache allocated to the respective storage volume not written to the respective storage volume; and
adjusting, by the processor, the write cache allowed data size of the write cache allocated to the plurality of storage volumes based on the respective write cache utilization of the plurality of write caches allocated to the plurality of storage volumes, the write cache allowed data size of the write cache allocated to the plurality of storage volumes not to exceed an upper limit defined by a maximum write cache size for use by the plurality of storage volumes, and not to exceed a lower limit defined by a minimum write cache size comprising a maximum stripe size, a stripe comprises a number of blocks in a storage volume distributed across a plurality of storage devices.

6. The method of claim 5, wherein when a write cache utilization of a write cache of a first storage volume is overutilized and a write cache allowed data size of the write cache of the first storage volume does not exceed an upper limit, and when a write cache utilization of the write cache of a second storage volume is underutilized and the write cache allowed data size of the write cache of the second storage volume does not exceed a lower limit, then moving a part of an unused portion of the write cache of the second storage volume to the write cache of the first storage volume.

7. The method of claim 5, wherein when write cache utilizations of the write caches of all storage volumes are not overutilized, then decreasing an allowed data size of a write cache of a most underutilized storage volume and increasing an allowed data size of a write cache of a most overutilized storage volume.

8. The method of claim 5, wherein when a first storage volume requires further write cache, where a limit is determined to have been reached by comparing a used write cache size of a write cache allocated to the first storage volume to a write cache allowed data size of the write cache allocated to the first storage volume, wherein when the limit is not reached, then allocating the further write cache to the first storage volume, wherein when the limit is reached then the first storage volume is to either wait for a used portion of the write cache allocated to the first storage volume to be flushed to the first storage volume or to bypass the write cache allocated to the first storage volume and directly write data to the first storage volume.

9. A non-transitory computer-readable medium having computer executable instructions stored thereon, the instructions executable by a processor to:
allocate a write cache allowed data size of a write cache from a plurality of write caches allocated to a plurality of storage volumes;
calculate a write cache utilization of the write cache for the respective plurality of storage volumes, the write cache utilization based on a write cache dirty data size of the write cache allocated to the respective storage volume divided by the write cache allowed data size of the write cache allocated to the respective storage volume, the write cache dirty data size of the write cache allocated to the respective storage volume comprises an amount of data written to the write cache allocated to the respective storage volume that has not been written to the respective storage volume; and
adjust the write cache allowed data size of the plurality of write caches allocated to the plurality of storage volumes based on the respective write cache utilization of the plurality of write caches allocated to the plurality of storage volumes, the write cache allowed data size of the write cache allocated to the plurality of storage volumes not to exceed an upper limit defined by a maximum write cache size for use by the plurality of storage volumes, and not to exceed a lower limit defined by a minimum write cache size comprising a maximum stripe size, a stripe comprises a number of blocks in a storage volume distributed across a plurality of storage devices.

10. The non-transitory computer-readable medium of claim 9 further comprising instructions that when executed cause the processor to:
when a write cache utilization of a write cache of a first storage volume is overutilized and a write cache allowed data size of the write cache of the first storage volume does not exceed an upper limit, and when a write cache utilization of the write cache of a second storage volume is underutilized and the write cache allowed data size of the write cache of the second storage volume does not exceed a lower limit, then move a part of an unused portion of the write cache of the second storage volume to the write cache of the first storage volume.

11. The non-transitory computer-readable medium of claim 9 further comprising instructions that when executed cause the processor to:
when write cache utilizations of the write caches of all storage volumes are not overutilized, then decrease an allowed size of a write cache of a most underutilized storage volume and increase an allowed size of a write cache a most overutilized storage volume.

* * * * *

UNITED STATES PATENT AND TRADEMARK OFFICE
CERTIFICATE OF CORRECTION

| | | |
|---|---|---|
| PATENT NO. | : 9,223,713 B2 | Page 1 of 1 |
| APPLICATION NO. | : 13/906291 | |
| DATED | : December 29, 2015 | |
| INVENTOR(S) | : Weimin Pan | |

It is certified that error appears in the above-identified patent and that said Letters Patent is hereby corrected as shown below:

Claims
In column 17, line 7, in Claim 5, delete "utilization is" and insert -- utilization --, therefor.

Signed and Sealed this
Nineteenth Day of April, 2016

Michelle K. Lee
*Director of the United States Patent and Trademark Office*